April 6, 1948.　　　A. V. KELLER　　　2,439,137

LAMINATED PLASTIC ARTICLE

Filed Dec. 20, 1940

Inventor
Auguste V. Keller
By
Attorney

Patented Apr. 6, 1948

2,439,137

UNITED STATES PATENT OFFICE 2,439,137

LAMINATED PLASTIC ARTICLE

Auguste V. Keller, Long Island City, N. Y., assignor to Thompson's Ltd., New York, N. Y., a corporation of New York Application December 20, 1940, Serial No. 371,040

2 Claims. (Cl. 154—129)

This invention relates to improvements in laminated plastic compositions and includes methods of making the same. More particularly, the invention relates to the provision of a plurality of sheets, preforms or other masses of fibrous material impregnated with a thermosetting or thermoplastic resinous composition which, in the production of molded articles of manufacture, may be assembled together with an interposed metallic conducting substance where desired and then subjected to heat and pressure to bond the various layers together. The invention also embraces molded products so compounded.

The laminated composition of my invention therefore comprises generally a plurality of layers of heat conducting and heat insulating laminations. In a preferred embodiment of the invention, certain of the resin impregnated fibrous masses characterized by heat insulating and shock resisting properties may be coated with a metallic thermo-conducting substance and the coated and non-coated masses then selectively interposed prior to compacting. Heretofore, heat insulating materials of this general type have been made by interposing a sheet of aluminum or like metal between two resin impregnated sheets of paper or fabric and subjecting the sheets to heat and pressure thereby producing a composite sheet of two materials widely differing in coefficients of expansion and contraction, and therefore, subject to uneven stresses and surface fracture. Also, products have been produced whereby asbestos in the form of fibre or in a finely comminuted condition is admixed with resins and molded under pressure and heat. These products however do not present the advantages of my novel composition from the standpoint of resistance to fracture and separation and efficient thermal conductivity as will hereinafter be more fully explained.

The laminated material of my invention is ideally adapted for the production of plastic products of various kinds among which may be mentioned rifle barrel supports, firing mechanism handles, breech block casings, searchlight housings or handles and in general housings or other structural members which are subject to heating by conduction, convection or radiation generated by or emanating from devices with which the parts are associated and where it is desirable quickly to disperse such heat or conduct the same away from areas where thermal protection is desired. The material of my invention is also well adapted for the production of structural moldings having insulating properties valuable in building construction and in the manufacture of refrigerator housings and the like. The material is also adapted for the production of housings or parts for radio instruments, static eliminators, condenser units or other electrical devices where the electrical conducting properties of the metallic laminations may be employed to advantage. The foregoing uses are merely exemplary and a wide variety of further specific uses will be readily apparent to those skilled in the art.

As a first step in the method of producing my novel composition, fibrous material of any desired character or other filler material is impregnated with a binding medium formed by the condensation of natural or synthetic resinous material such as a urea, sucrose or phenol with an aldehyde or the product of the saponification and condensation of a polyvinyl alcohol with an aldehyde or other resinous producing materials capable of providing a thermosetting or a thermoplastic binder with the fiber.

Selected sheets, preforms or other masses of plastic binder impregnated fibrous material as above described are preferably loosely compacted and then subjected to a metallizing operation or provided with a coating of metal in any desired manner. It is desirable that the metal coat be continuous and that it conform in general to the irregular contour of the surface of the loosely compacted impregnated fibrous mass so that when the sheet is juxtaposed with non-coated impregnated bodies and subjected to heat and pressure the resinous materials of the latter will flow into the surface irregularities of the metallic layer and become keyed therein whereby securely to bond the bodies together.

Among various ways in which the plastic impregnated fibrous sheets or masses may be appropriately coated with a metalic conducting substance, I suggest the following as preferable:

A dried resin impregnated sheet or preform of fiber may be immersed in an alcoholic solution of silver nitrate until by the slight solvent action of the alcohol the silver nitrate penetrates the surface. The mass may then be dried and subjected to fumes of hydrogen sulfide until a black film of silver sulfide is formed. The silver sulfide thus formed may be utilized as a conductor so that the mass may be plated in an acid copper solution or other metal solution until the deposited metal has attained the required thickness. Care should be taken that the electro-deposited coating is continuous throughout the irregular surface of the impregnated fibrous mass.

In another preferred method of coating, the impregnated fiber sheet or preform may be sprayed with a fine dispersion of metal by means of a metal spraying gun of a well known type in which the desired metal in the form of wire is pulled through a gun fed with oxygen, compressed air and a combustible gas under pressure. In this manner particles of the wire melted during the passage through the hot zone are projected from the melting end in a fine spray and deposited upon the backing sheet in a fine matte having numerous interstices. The spraying conditions may be so arranged that metal particles leaving the nozzle are nearly cold and therefore do not carbonize the fiber or deteriorate its tensile strength or color or cause any accelerated or pre-polymerization of the binding medium but on the other hand are tenaciously keyed to the fiber mass in a continuous layer over and between the individual surface fibers. The metal particles may not exceed one-thousandth of a millimeter in diameter and their impact with the atmosphere at a velocity of 62,000 feet per minute alters their shape so that the still semi-fluid or plastic yet cool metal enters between and around the fibers with only slight almost microscopically invisible oxidation of the metal particles. The surface layer of fibers is thus covered with a metallic structure of a thin non-porous metal layer of high thermal and electrical conductivity, each metal particle being held together by mechanical locking and partial instantaneous fusion at the moment of impact. This spraying method often possesses advantages over the plating method since X-ray analysis indicates that the sprayed metal particles are slightly work hardened and this, combined with the slight oxide film, gives a total hardness and a tensile strength in excess of the hardness of the metal in the cast state.

In another suitable manner of metallizing, the impregnated fibrous mass may be interposed between or have applied to a surface thereof to be coated sheets of woven metal wire or thin foils preferably having openings or relatively large and widely spaced perforations therein to expose the binding medium. When such perforations are provided, I prefer that the perforations of one metal layer be staggered with respect to the perforations of the adjacent metal layers in order that a current of heat cannot pass through the laminated mass without being intercepted by one or more metal heat conducting surfaces.

As a still further method of metal coating, the loosely compacted resin impregnated fibrous mass may be coated with a powdered metal in suspension, preferably, in a solution of the resin whereby the deposited metal particles form a continuous layer over the surface of the mass.

It will be understood that in whatever metal applying method is employed the metal coat or sheet may be provided, as desired, on both sides or one side only of the fiber-resinous layer and terminate substantially at the ends thereof or it may be applied to the ends as well as to one or both sides of the layers.

In a specific embodiment of the invention I contemplate the provisions of sheets, preforms or other masses of fibrous material impregnated with the binding or resinous medium in various different degrees whereby to provide masses of selective porosity or density thereby deliberately and selectively to affect thermo-conductivity and other characteristics of the mass. Laminated bodies made up of metal coated and non-coated layers of different porosities or densities have been found to be extremely advantageous in the production of various articles such as handles in housings which are subjected to heat and which, for efficient functioning, are required to dissipate or otherwise controllably conduct such heat.

The accompanying drawings serve to illustrate aspects of the invention as above and hereinafter further described.

Figure 1:
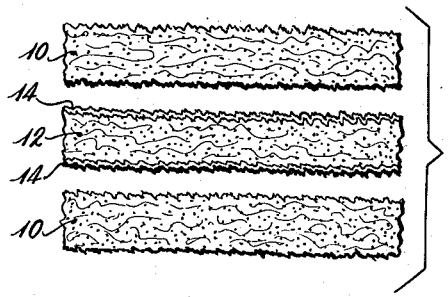
Fig. 1 is a fragmentary section of a metal coated layer of resin impregnated fibrous material as contemplated by the invention, interposed between two similar but uncoated layers, the layers being of the same density.
Figure 2:
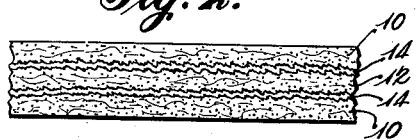
Fig. 2 is a view similar to Fig. 1 but showing the layers compacted together as by the application of heat and pressure.

Referring more particularly to the drawings, Figs. 1 and 2 represent one form of the laminated composition contemplated by the invention and Fig. 1 illustrates in fragmentary section a series of such laminations in spaced-apart relationship. Herein the bodies 10 and 12 represent sheets, preforms or other masses of fibrous or filler material impregnated with any natural or synthetic thermosetting or thermoplastic resinous material and preferably in a loosely or incompletely compacted form. The intermediate body 12 has been subjected to a metallizing treatment as above described or in any other suitable manner whereby there is provided on the sides thereof a coating or layer of a metallic heat conducting substance. Thus, when the coated and uncoated layers are subjected to heat and pressure they will become bonded together in an integral laminated structure having alternate conducting and non-conducting layers as illustrated in Fig. 2. For purposes of simplicity, I have illustrated three layers comprising one coated body with uncoated bodies on each side thereof but it will be understood that any desired number of layers of resin impregnated fibrous material, either uncoated or coated on one or both sides, may be assembled and compounded together in any desired combination.

The bond between the coated and uncoated laminations is resin to metal except where perforated metal layers are provided in which case there is also a resin to resin bond through the perforations. To insure a secure resin to metal bond, I provide the surface receiving the metal coat in an arborescent, crenulated, dentelated or other irregular or uneven form and adjust the coating conditions so that the metal substantially follows the contour of its receiving surface in a continuous layer over and between the matted or individual surface fibres. Thus, the metal layer provides a key so that when uncoated and coated surfaces are juxtaposed for lamination the resin of the uncoated surface will flow into the valleys or depressions of the uneven metal layer during the period of fluxing under the heat and pressure of the molding operation and become keyed therein. Similarly the resin of the coated mass will become keyed to the opposite surface of the metal coat so that upon completion of molding and hardening the resulting metal and fiber-resin laminations are adhered together and securely keyed in a very strong bond. Ordinarily the surface to be metal coated will be in such irregular or uneven form when the resin impregnated fibre mass is loose or only incompletely compacted that it is unnecessary to provide a special surface treating step to produce the desired irregularities.

In a specific embodiment of the invention I prefer to employ purified ramie fibers because of the extremely low heat conductivity of such material. Thus, when resin impregnated, fibrous material of this character is employed with a metal of relatively high conductivity, such as silver, I obtain a perfect combination of a metal of high thermo-conductivity adjacent to a material of low thermo-conductivity together with excellent qualities of high impact strength and resistance to fracture combined with low specific gravity and good appearance. It will be understood however that the invention is not restricted to any particular metal or fibre and, to indicate the range of materials within the scope of the invention and to serve as a guide for the selection of materials according to availability or adaptation for a particular purpose, I append the following comparative heat conductivity table:

| | Relative conductivity of heat |
|---|---|
| Silver | 100 |
| Copper | 92 |
| Aluminum | 48 |
| Zinc | 27 |
| Brass | 2–26 |
| Platinum | 17 |
| Iron (Armco) | 12–15 |
| Lead | 8 |
| Steel (hard) | 6–10 |
| Steel (soft) | 10–12 |
| German silver | 7–8 |
| Mercury | 1.6 |
| Concrete (3:1) | .22 |
| Slate | .18 |
| Glass (soda) | .11–.23 |
| Dry soil | .033 |
| Fire clay | .028 |
| India rubber | .026 |
| Air | .026 |
| Salt | .025 |
| Sand | .025 |
| Asbestos | .023 |
| Paper | .023 |
| Magnesia | .022 |
| Wood flour (spruce 200 mesh) | .022 |
| Linen (woven) | .021 |
| Felt (woolen woven) | .0095 |
| Silk (woven) | .0087 |
| Cotton (fibre mat) | .0043 |
| Rhea ramie (fibre mat) | .0032 |

Figure 3:
Fig. 3 is a fragmentary section of a series of coated and uncoated layers impregnated with resin in different degrees, the layers having different porosities or densities.
Figure 4:
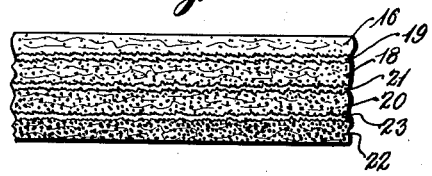
Fig. 4 is a view similar to Fig. 3 but showing the layers compacted together after the application of heat and pressure.

Figs. 3 and 4 illustrate in fragmentary section another form of the invention wherein the various layers or preforms are impregnated with different quantities of resinous material whereby to produce bodies of selectively varied porosity or density and, hence, varied conductive capacity. Preferably, this form of the invention employs layers of fibrous material impregnated with resin in progressively increasing degrees and arranged so that the least dense layer of greater porosity and of greater heat conductive capacity may comprise that portion of a molded article most proximate to a source of heat and the most dense layer of porosity and of poor heat conductive capacity provided at the exterior face of the molded article remote from the source of heat where but a very small degree of heat will penetrate.

The body 16 of Figs. 3 and 4 illustrates a low resin content fibrous layer of sufficient porosity to facilitate passage of heat from the exterior face of layer 16 to the metallized layer or coat 19 which has been initially provided on the layer 18 but which after subjection of the laminations to heat and pressure has become bonded between the layers 16 and 18. The body 18 represents a fibrous layer of higher resin content and increased density but of sufficient porosity to transmit heat to the metallic layer 21. The body 20 is a fibrous layer of a still higher resin content than either 16 or 18 but of sufficient porosity to transmit remaining residual heat to the metal layer 23. The exterior body 22 desirably is of sufficient resin content to provide an exterior surface for the molded article having a good color and of a homogeneity to give a wear-proof exterior, warm and smooth to the feel of the hand and capable of receiving a fine finish. The material of layer 22 is also such that it may be indented or matte finished during the molding operation to provide a non-slip or grip surface of finished appearance.

It will be understood that the metal layers 19, 21 and 23 preferably extend to one or more edges of the laminated composite or substantially to such edges so that an edge of the metal layers may terminate near or be exposed at the exterior surface of the molded article whereby to dissipate transmitted heat to the atmosphere at such exterior point.

Figure 5:
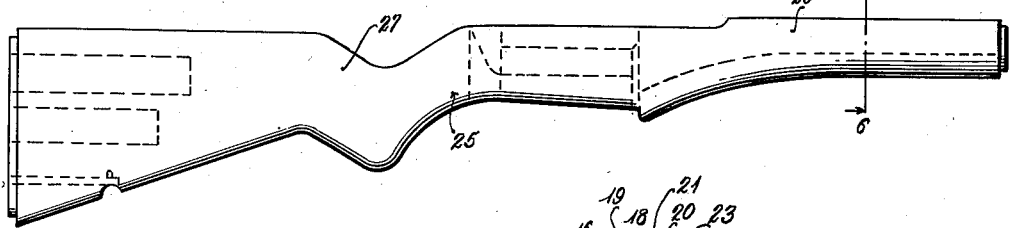
Fig. 5 is a fragmentary side elevational view of a gun stock as illustrative of articles which may be produced according to the present invention.
Figure 6:
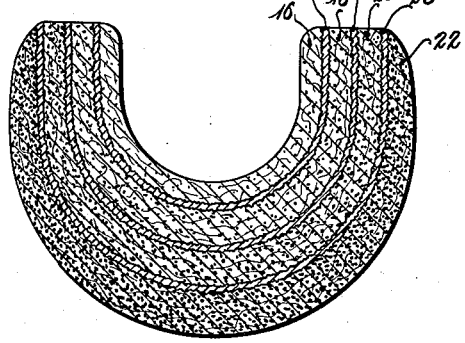
Fig. 6 is a section on line 6—6 of Fig. 5.

As exemplary of the kind of molded articles for which the laminated composition of my invention is particularly adapted, I have illustrated in Fig. 5 a rifle or gun stock, heretofore ordinarily constructed of hard wood, and in which the barrel and other metal accessories are omitted. Such a stock is indicated in its entirety at 25 and comprises generally a butt portion 27 and a forward hand rest portion 29. Constant or rapid firing of a gun equipped with such a stock will generate considerable heat most noticeable to the operator at the portion 29 thereof where the barrel is manually supported and I have, therefore, found it advantageous to construct the entire stock or at least the portion of the guard 29 thereof ordinarily engaged by the hand of the operator of the particular laminated composition of either of the two forms of the invention above described and illustrated and particularly that illustrated in Figs. 3 and 4. Accordingly, the sectional view of Fig. 6 illustrates the composition of Fig. 4 after the same has been molded and shaped in the form of the fore part 29 of gun stock 25. It will be observed that the least dense and highly porous layer 16 comprises the interior of the stock in contact with the barrel and most proximate to the source of heat and that the layer of greatest density and low porosity provides the exterior face of the stock where it contributes its qualities of feel and appearance. The heat conductive metallic layers 19, 21 and 23 are preferably disposed parallel to the center line of the stock and either terminate near or are exposed at the surface of the fore part of the stock so that radiation to the atmosphere may occur at that point. Other edges of the metal laminations may if desired be brought to the surface of the stock at any suitable point normally out of contact with the hands of the operator.

It will be understood that the specific molded rifle stock herein illustrated is merely exemplary of a huge number of specific molded products contemplated by the invention and that the said stock or other articles may be compounded from my laminated composition either in whole or in part and with the laminations running in any selected direction or indiscriminately.

What I claim is:

1. A molded article comprising, layers of resin impregnated fibrous material, the resin content of each of said layers differing to provide layers of varied density and varied heat conductivity, the said layers being assembled successively in the order of their heat conductivity to provide a layer of relatively low conductivity at one side and a layer of relatively high conductivity at the opposite side of the article, and heat conducting metallic layers interposed between and bonded to selected adjacent layers of said resin impregnated fibrous material.

2. A molded article comprising, layers of resin impregnated fibrous material, the resin content of each of said layers differing to provide layers of varied density and varied heat conductivity, the said layers being assembled successively in the order of their heat conductivity to provide a layer of relatively low conductivity at one side and a layer of relatively high conductivity at the opposite side of the article, and heat conducting metallic layers interposed between and bonded to selected adjacent layers of said resin impregnated fibrous material, selected metallic layers extending to and being open at the exterior surface of said article whereby to conduct heat away from the interior of said article.

AUGUSTE V. KELLER.

REFERENCES CITED

The following references are of record in the file of this patent:

UNITED STATES PATENTS

| Number | Name | Date |
|---|---|---|
| 1,398,143 | Novotny | Nov. 22, 1921 |
| 1,444,345 | Heygel | Feb. 6, 1923 |
| 1,809,984 | Mains | June 16, 1931 |
| 1,967,844 | Schuricht | July 24, 1934 |
| 2,020,776 | Goebel | Nov. 12, 1935 |
| 2,039,372 | Wickman | May 5, 1936 |
| 2,129,125 | Geyer | Sept. 6, 1938 |
| 2,205,891 | Springer | June 25, 1940 |
| 2,249,888 | Dodge | July 22, 1941 |

FOREIGN PATENTS

| Number | Country | Date |
|---|---|---|
| 340,991 | Great Britain | Dec. 30, 1930 |
| 440,578 | Great Britain | Jan. 2, 1936 |